(12) United States Patent
Yoshida et al.

(10) Patent No.: US 7,480,069 B2
(45) Date of Patent: Jan. 20, 2009

(54) DATA PROCESSING APPARATUS

(75) Inventors: Mayuko Yoshida, Souraku-gun (JP); Shinsaku Tohki, Tenri (JP); Kumiko Ogino, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 979 days.

(21) Appl. No.: 10/774,142

(22) Filed: Feb. 6, 2004

(65) Prior Publication Data

US 2004/0156068 A1    Aug. 12, 2004

(30) Foreign Application Priority Data

Feb. 10, 2003    (JP)    ............................. 2003-032766

(51) Int. Cl.
*G06F 15/00*    (2006.01)
(52) U.S. Cl. .................... 358/1.16; 358/1.15; 358/1.17; 345/156; 455/456.1
(58) Field of Classification Search ....... 358/1.15–1.17; 345/156; 455/456.1
See application file for complete search history.

(56) References Cited

U.S. PATENT DOCUMENTS

| | | | | |
|---|---|---|---|---|
| 6,151,464 | A * | 11/2000 | Nakamura et al. | ............ 399/79 |
| 2002/0048042 | A1* | 4/2002 | Iwase et al. | ............. 358/1.15 |
| 2002/0174010 | A1* | 11/2002 | Rice | ............. 705/14 |
| 2003/0095284 | A1* | 5/2003 | Parry | ........................ 358/1.16 |
| 2003/0115326 | A1* | 6/2003 | Verma et al. | ................. 709/225 |
| 2004/0004735 | A1* | 1/2004 | Oakeson et al. | ............. 358/1.15 |
| 2004/0215525 | A1* | 10/2004 | Keane et al. | ................... 705/26 |

FOREIGN PATENT DOCUMENTS

| | | |
|---|---|---|
| JP | 04-167673 | 6/1992 |
| JP | 09-284518 | 10/1997 |
| JP | 11-98454 | 4/1999 |
| JP | 11-175290 | 7/1999 |
| JP | 11-225255 | 8/1999 |
| JP | 2003-298821 | 10/2003 |

* cited by examiner

*Primary Examiner*—Edward L Coles
*Assistant Examiner*—Chan S Park
(74) *Attorney, Agent, or Firm*—David G. Conlin; Steven M. Jensen; Edwards Angell Palmer & Dodge LLP

(57) ABSTRACT

A data processing apparatus is provided in which data is stored in a state distributed to a storage destination depending on the data property, so that the stored data is reused easily and that the storage of the data is managed efficiently on the basis of the data property. Storage means comprises a first storage section, a second storage section, and a memory controller serving as data distributing means. The first storage section temporarily stores data outputted (processed for output) from each section (a scanner section, a FAX section, a network processing section, etc.) of data processing means. The second storage section comprises storage regions partitioned in correspondence to the data properties, and stores data satisfying a predetermined condition among the data outputted (processed for output). The memory controller distributes the data to either the first storage section or the second storage section depending on the data property.

9 Claims, 11 Drawing Sheets

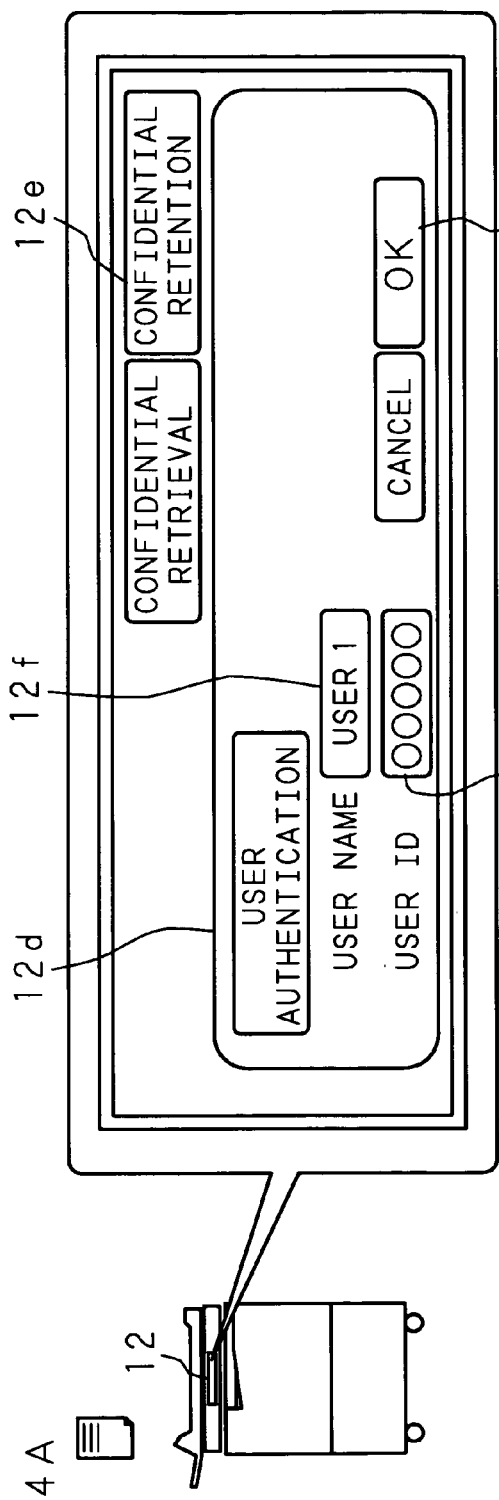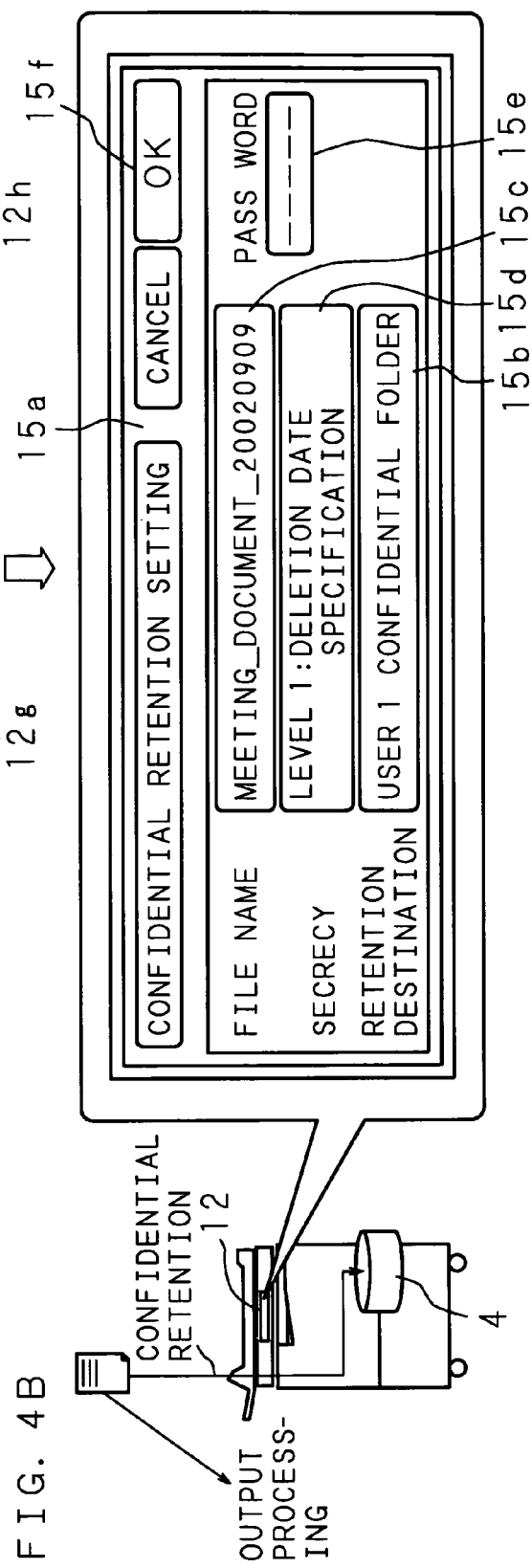
FIG. 4A
FIG. 4B

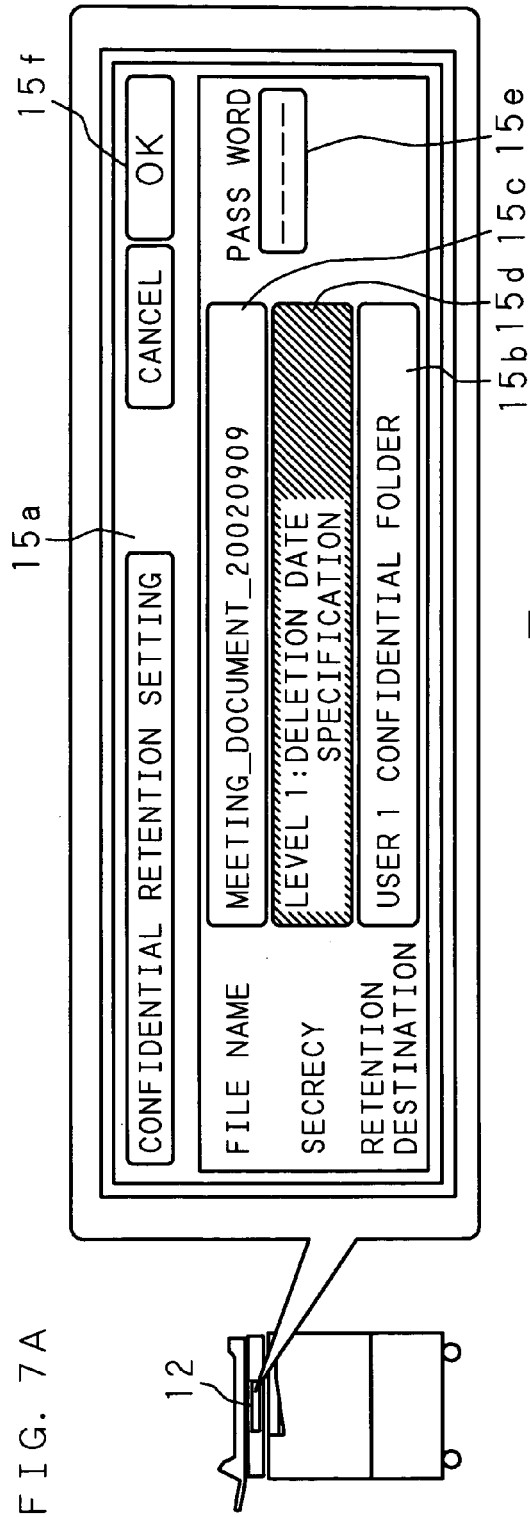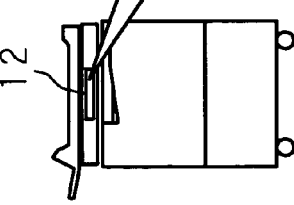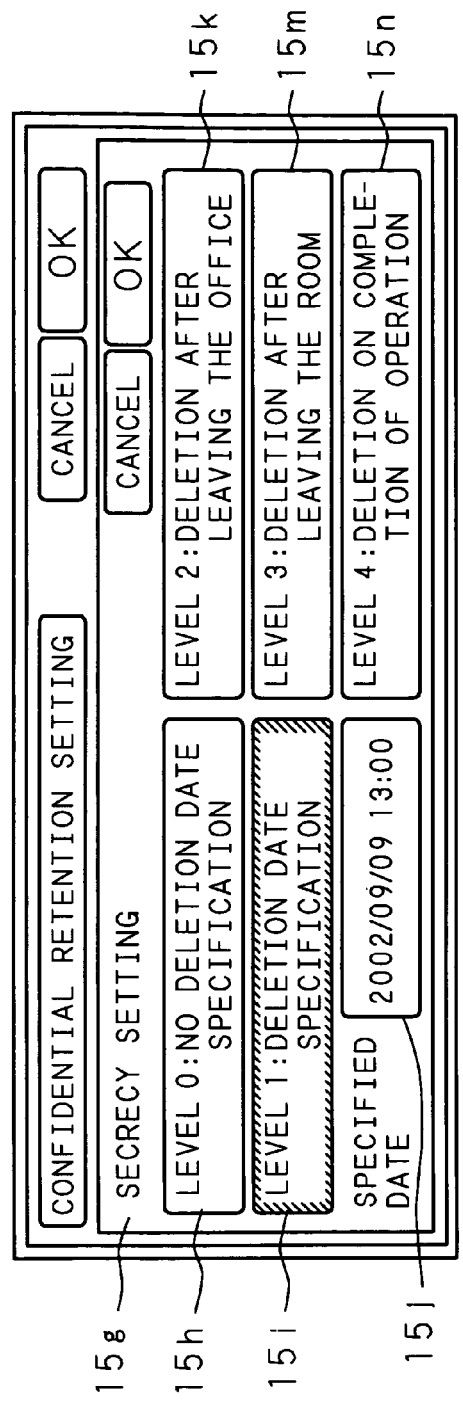

DATA PROCESSING APPARATUS

This Nonprovisional application claims priority under 35 U.S.C. § 119(a) on Patent Application No. 2003-032766 filed in Japan on Feb. 10, 2003, the entire contents of which are hereby incorporated by reference.

BACKGROUND OF THE INVENTION

The present invention relates to a data processing apparatus implemented as a digital composite apparatus having the combined functions of a copying machine, a facsimile machine, a printer, and the like and, in particular, to a data processing apparatus comprising storage means for storing data in a state distributed to a storage destination depending on the data property of the data.

DESCRIPTION OF THE RELATED ART

In a data processing apparatus such as a printer, a configuration is known in which even after the completion of a print job (the printout of data), the printed-out data (image data or the like) remains saved in a storage device built in the data processing apparatus. According to this configuration, the data having been printed out once can be outputted as many times as desired, without the necessity of re-inputting the data.

An example of printer is known in which even after a print job is executed and outputted, the image data remains stored inside the apparatus, so that a repeated print job is executed in response to an output instruction (including the number of print copies, the requirement or omission of post-processing, and the like) for a print job issued from an external apparatus (see Japanese Patent Application Laid-Open No. 11-175290, for example). Further, an image forming apparatus is known that comprises the function of retaining already-outputted image data inside the apparatus (see Japanese Patent Application Laid-Open No. 11-225255 and Japanese Patent Application Laid-Open No. 09-284518, for example).

A prior art digital composite apparatus (a composite apparatus, hereafter) is known that comprises a "confidential printing" function. The "confidential printing" function indicates that, for example, print data transmitted from a network-connected client is not directly outputted but stored temporarily along with a password, so that the print data is printed out later as a print job after password authentication in response to an instruction.

As an example of implementation of the "confidential printing" function, a facsimile machine is known in which the number of days for the retention of confidentially received image data can be set, so as to prevent the image data from being deleted automatically before the recipient receives the data (see Japanese Patent Application Laid-Open No. 04-167673, for example).

Further, the present applicant has proposed an information outputting apparatus (data processing apparatus) comprising storage means capable of temporarily saving (storing) outputted data into a first storage means and then saving (storing) the data in a state classified depending on the data property into a second storage means when necessary, so that the data is easily retrieved and reused later (see Japanese Patent Application Laid-Open No. 2003-298821).

In the prior art examples disclosed in Japanese Patent Application No. Japanese Patent Application Laid-Open No. 11-175290, Japanese Patent Application Laid-Open No. 11-225255, and Japanese Patent Application Laid-Open No. 9-284518, the outputted data (image data) is deleted after a predetermined time, or alternatively stored merely in the order of input even if stored. This causes the problem that when a large amount of image data is stored, the searching of desired image data in future becomes difficult. Further, the prior art disclosed in Japanese Patent Application Laid-Open No. 04-167673 merely allows the user to set the expiration date for the retention of the confidential data in terms of the number of days, and has the problem that the confidential data cannot be processed on the basis of other criteria or requirements such as secrecy and importance.

SUMMARY OF THE INVENTION

The invention has been devised with considering these problems. An object of the invention is to provide a data processing apparatus not merely for outputting data such as image data, but also for storing the data in a state distributed to a storage destination depending on the data property of the data so as to permit easy reuse of the stored data and efficient storage management of the data based on the data property.

Another object of the invention is to provide a data processing apparatus in which data having a data property of confidentiality is distributed to a second storage section, so that the convenience and the security when the data is set to be confidential is improved.

Another object of the invention is to provide a data processing apparatus in which a retention condition or a deletion condition of data can be set in each data job when the data is set to be confidential, so that the storage management of the data (storage management such as retention and deletion) can be performed with fine adjustment, and that the convenience is improved.

Another object of the invention is to provide a data processing apparatus in which a date is set as the deletion condition of data when the data is set to be confidential, so that the stored data is deleted when the set date arrives. By virtue of this, when a date is inputted as the deletion condition of the data along with the inputting of the file name and the like, the data is deleted automatically when the set date arrives.

Another object of the invention is to provide a data processing apparatus in which a determination level specifying the level of the secrecy or the importance of data is inputted when the data is set to be confidential This allows the user to input a determination level of the secrecy or the importance with confirming directly the determination level of the secrecy or the importance when the data is set to be confidential.

Another object of the invention is to provide a data processing apparatus in which the determination level specifying the level of the secrecy or the importance is those classified into a plurality of classes so that a deletion condition is set for each class, and in which when the deletion condition is satisfied, the data is deleted automatically. This allows the storage management of the data relevant to the secrecy or the importance to be performed with fine adjustment, and permits secure deletion of the data.

Another object of the invention is to provide a data processing apparatus in which the deletion condition corresponding to the determination level specifying the level of the secrecy or the importance is a date for the deletion of the data. This permits secure deletion of the data based on the date specified and inputted by the user.

Another object of the invention is to provide a data processing apparatus in which the deletion condition corresponding to the determination level specifying the level of the secrecy or the importance is the situation of the location of the person of the confidentiality setting. This permits easy setting of the deletion condition and improves the convenience.

An aspect of the invention is a data processing apparatus which performs output processing on plural pieces of data having distinct data properties, in respective forms corresponding to the data properties, and which comprises storage means for storing said data having undergone said output processing, wherein said storage means comprises: a first storage section for storing said data; a second storage section for storing corresponding data into respective storage regions partitioned in correspondence to said data properties; and data distributing means for distributing said data to either the first storage section or the second storage section depending on the data property.

In a data processing apparatus according to the invention, said data distributing means distributes data having a data property of confidentiality to the second storage section.

A data processing apparatus according to the invention comprises: confidentiality setting means for setting said data to be confidential; and condition setting means for setting a retention condition or a deletion condition of data in each data job when said data is set to be confidential.

A data processing apparatus according to the invention comprises: date inputting means for inputting a date as the deletion condition of said data; calendar detecting means for detecting the date corresponding to said inputted date; and data deleting means for deleting said data when the date corresponding to said inputted date is detected.

A data processing apparatus according to the invention comprises: confidentiality setting means for setting said data to be confidential; and determination level inputting means for inputting a determination level depending on the level of the secrecy or the importance of said data when said data is set to be confidential.

In a data processing apparatus according to the invention, said determination level is those classified into a plurality of classes, and wherein said apparatus comprises: deletion condition setting means for setting a deletion condition for deleting said data, in each of said classes; and automatic deleting means for deleting said data automatically when said deletion condition is satisfied.

In a data processing apparatus according to the invention, said deletion condition is a date for the deletion of said data.

In a data processing apparatus according to the invention, said deletion condition is the situation of the location of the person of the confidentiality setting.

In a data processing apparatus according to the invention, said data distributing means is a memory controller connected to said first storage section and said second storage section.

According to the invention, data is distributed to a storage destination depending on the data property of the data so that data having a specific data property is stored in a storage destination different from these of data having other data properties. This permits efficient use of the storage means, storage management based on the data property, and easy reuse of the stored data. Further, the data distribution is performed in the initial stage. This avoids unnecessary movement of the data and hence improves the efficiency in the storage management of the data, in comparison with the case that all data is temporarily stored into a first storage section and then data having a specific data property is moved to a second storage section.

According to the invention, data (confidential data) having a data property of confidentiality is distributed to a second storage section, so that the confidential data is directly stored and retained in the second storage section. This permits secure execution of confidentiality setting, and hence avoids unlimited operation from many and unknown users. That is, the data is not stored in the first storage section to which many and unknown users can access, and hence the data is protected from the use by many and unknown users and also from unlimited operation by them. This permits secure and safe execution of the function of confidentiality setting. This improves the effect in the storage management of the specific data having been set to be confidential That is, the configuration that the confidential data is stored directly into the second storage section in the initial stage permits restriction against accesses from the outside. This improves substantially the security level in the storage of the data.

According to the invention, a retention condition or a deletion condition of data is set in each data job when the data is set to be confidential. This allows the storage management of data and the management of confidentiality setting to be performed with fine adjustment and with a higher efficiency. Further, this permits various condition setting and improves the convenience in the data processing apparatus.

According to the invention, a date is set as the deletion condition of data when the data is set to be confidential. This improves the functionality and the operability in the confidentiality setting. For example, when a date is inputted and added to the file name of a job, the date is specified and inputted securely. This avoids the necessity of setting the deletion date separately, and hence reduces the opportunity of a mistake in the deletion date. Further, the data is deleted automatically when the set date arrives. This avoids the necessity of inputting the deletion date newly, and hence improves the convenience for the user.

According to the invention, in addition to the confidentiality setting means for setting the data to be confidential, the apparatus comprises determination level inputting means for inputting a determination level depending on the level of the secrecy or the importance of the data when said data is set to be confidential By virtue of this, a determination level can be set depending on the level of the secrecy or the importance when the data is set to be confidential. This improves the convenience in the confidentiality setting. Further, this allows the user to set the confidentiality with confirming directly the determination level of the secrecy or the importance. This reduces the opportunity of a mistake in the operation, and hence improves the convenience in the confidentiality function.

According to the invention, the determination level is those classified into a plurality of classes, so that a deletion condition is set for each class. Then, when the deletion condition is satisfied, the data is deleted automatically. By virtue of this, the level of the secrecy or the importance can be set depending on a plurality of criteria. This allows the setting of the level of the secrecy or the importance to be performed with fine adjustment. This improves the convenience in the confidentiality setting. Further, since a deletion condition is set for each of the classes depending on the level of the secrecy or the importance, the setting criteria for the setting of the level of the secrecy or the importance can be defined objectively. This avoids dispersion in the criteria of various users. Further, when the deletion condition is satisfied, the data is deleted automatically. This permits secure data retention management (data storage management) in the confidentiality setting.

According to the invention, the deletion condition corresponding to each determination level is a date for the deletion of the data. This permits secure deletion based on the schedule specified and inputted by the user.

According to the invention, the deletion condition corresponding to each determination level is the situation of the location of the person of the confidentiality setting. This permits easy setting of the deletion condition in the confidentiality setting, hence reduces the opportunity of a mistake in the operation, and improves the convenience in the data processing apparatus.

According to the invention, the data distributing means is composed of a memory controller connected to said first storage section and said second storage section. This realizes a data processing apparatus having a simple configuration and capable of distributing the data.

The above and further objects and features of the invention will more fully be apparent from the following detailed description with accompanying drawings.

BRIEF DESCRIPTION OF THE DRAWINGS

FIGS. 4A and 4B are diagrams illustrating the situation of execution of a method for retaining confidential data in a composite apparatus operating as a scanner.

FIGS. 7A and 7B are diagrams illustrating the situation of execution of a method for setting a level of secrecy.

DETAILED DESCRIPTION OF THE PREFERRED EMBODIMENTS

The invention is described below with reference to the drawings illustrating its embodiments.

Figure 1:
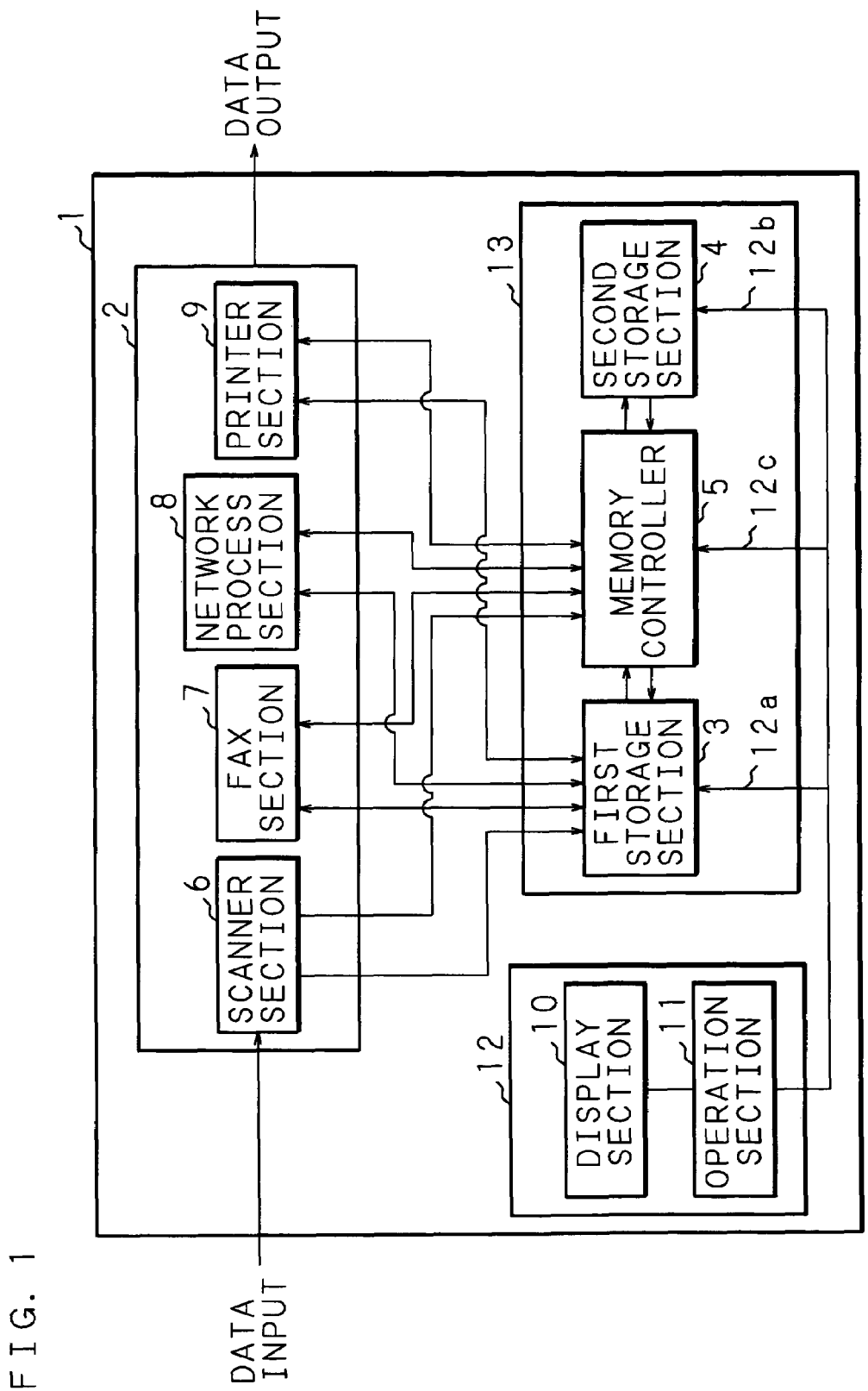
FIG. 1 is a block diagram showing a schematic block configuration of a data processing apparatus according to the invention.

FIG. 1 is a block diagram showing a schematic block configuration of a data processing apparatus according to the invention. The data processing apparatus 1 performs output processing (such as printout and FAX transmission) corresponding to the data properties onto plural pieces of data having data properties different from each other. The data described here may be various data containing various kinds of information, in addition to image data. Thus, when the data is image data, the apparatus may be referred to as an image processing apparatus 1. However, the apparatus is generically referred to as the data processing apparatus 1 in the following description.

The data processing apparatus 1 is incorporated in a digital composite apparatus (a composite apparatus, hereafter) having the combined functions of a copying machine, a facsimile machine (a FAX machine, hereafter), a printer, and the like, and thereby performs input and output processing onto plural pieces of data having various forms (data properties) different from each other. The data processing apparatus 1 comprises data processing means 2, an operation panel 12, and storage means 13, as major components.

The data processing means 2 comprises a scanner section 6, a FAX section 7, a network process section 8, and a printer section 9. These sections perform input and output processing of data having data properties different from each other. The scanner section 6 performs an electronic exposure and scanning onto the data to be copied, and thereby reads the data. The FAX section 7 comprises a FAX receiving section (not shown) and a FAX transmitting section (not shown) for performing FAX reception and FAX transmission, respectively. The FAX receiving section performs output processing onto FAX-received data from a sender, and thereby outputs the data as received information onto a recording medium (such as printer paper) through an image forming section (not shown) of the printer section 9 (recording onto a recording medium).

The data received in the FAX receiving section can also be outputted through the network process section 8 to an external personal computer (PC, hereafter). The FAX transmitting section outputs the data read by the scanner section 6 to a specified destination (FAX transmission). In addition to the FAX-received data, the printer section 9 outputs the printout data of which has been instructed from an external PC via the network process section 8, as well as the data read by the scanner section 6. As such, the data processing means 2 performs various output processing corresponding to the outputted data forms (output processing corresponding to the data properties) onto plural pieces of data having a plurality of various forms (plural pieces of data having distinct data properties).

For example, when the composite apparatus comprising the data processing apparatus 1 operates as a copying machine, a manuscript or the like is first read as data (image data) by the scanner section 6 of the data processing means 2. The read-out data undergoes appropriate data processing (image processing) such as color correction, and then is outputted from the printer section 9. When the composite apparatus comprising the data processing apparatus 1 operates as a FAX machine, in FAX transmission, data read by the scanner section 6 undergoes data processing for transmission in the FAX section 7, and then is outputted to a destination (FAX transmission).

Further, in FAX reception, received data undergoes data processing for FAX reception in the FAX section 7, and then is outputted from the printer section 9. When the composite apparatus comprising the data processing apparatus 1 operates as a network scanner, data read by the scanner section 6 is outputted through the network process section 8 to a PC of destination (a transmission process). Further, data received from a PC connected to the network is inputted through the network process section 8, and then is outputted from the printer section 9.

The storage means 13 comprises a first storage section 3, a second storage section 4, and a memory controller 5 serving as the data distributing means. The first storage section 3 temporarily stores the data outputted (having undergone the output processing) from each of the sections (the scanner section 6, the FAX section 7, the network process section 8, and the printer section 9) of the data processing means 2. The second storage section 4 comprises storage regions partitioned in correspondence to the data properties of the data, and thereby stores data satisfying a predetermined condition among the data outputted (having undergone the output processing). The memory controller 5 distributes the data to either the first storage section 3 or the second storage section 4 depending on the data property of the data.

That is, data having a specific data property is not stored into the first storage section 3, and distributed directly to the second storage section 4. At this time, in the present configuration, the data having a specific data property is transmitted through the memory controller 5 to the second storage section 4. However, the data having a specific data property may be transmitted not through the memory controller 5 but directly to the second storage section 4 by means of setting a specific address or the like.

A preferable specific data property is, for example, a confidentiality setting. This clarifies better the effect of the invention in the function of the composite apparatus. In the present configuration, data having a data property other than the specific data property is distributed to the first storage section 3. When the specific data property is the confidentiality setting, in the operation of output (printout) and the like, a password is requested. Then, after the password authentication, the operation of the apparatus is permitted, so that many and unknown users are prevented from operating the apparatus.

The specific data property is not limited to the confidentiality setting, and may be another data property. For example, when data of a large capacity used solely by a user A is stored in a personal folder for the user A provided in the second storage section 4, the storage capacity of the first storage section 3 is saved by this amount. Alternatively, when FAX reception data periodically transmitted from a company B is stored in a dedicated folder for the company B provided in the second storage section 4, this configuration avoids the necessity of searching and ordering later the data stored in the first storage section 3.

The data temporarily stored in the first storage section 3 is ordered appropriately by the function of the memory controller 5, and moved appropriately and depending on the necessity, to the storage regions in the second storage section 4 partitioned in correspondence to the data properties. That is, the memory controller 5 determines whether the data temporarily stored in the first storage section 3 is to be moved to the second storage section 4 or not, and thereby controls the transfer of the data from the first storage section 3 to the second storage section 4 depending on the necessity.

The memory controller 5 further comprises means for determining whether the outputted data is to be stored into the second storage section 4 or not in each job of the data. When data is desired to be re-outputted because of a printing error or an insufficient number of outputted copies, the data stored in the first memory section 3 or the second memory section 4 is transmitted from the first memory section 3 or the second memory section 4 to the data processing means 2 in response to an instruction from the operation panel 12 or a PC connected to the network.

In general, the first storage section 3 may have a smaller storage capacity than the second storage section 4. In this case, the data stored in the first storage section 3 may be deleted sequentially, so that new data may be stored by overwriting the old data. Alternatively, the data may be deleted automatically when a predetermined time has elapsed. In contrast, in the present configuration, the data stored in the second storage section 4 is not automatically deleted. When no vacant region is left in the second storage section 4, an error is displayed, for example, on the display section 10 of the operation panel 12 so that the user is notified. The user deletes unnecessary data or adds a storage capacity, so as to generate or add a new vacant region. The storage regions partitioned in correspondence to the data properties in the second storage section 4 may be in the form of folders. In this case, the memory controller 5 re-stores the data having been stored in the first storage section 3 into appropriate folders in the second storage section 4 in an ordered state.

The operation panel 12 comprises a display section 10 and an operation section 11. The display section 10 displays the operation status and the like of the data processing apparatus 1, and is composed of a liquid crystal display or the like. The operation section 11 comprises: various buttons provided on the operation panel 12 used for the operation of the data processing apparatus 1 on the basis of the information on the display section 10; and a transparent touch panel provided on the display surface of the display section 10. Detail of the display surface is described later. The operation section 11 allows the user to operate the data processing apparatus 1 from the outside. An instruction from the operation section 11 is transmitted to the first storage section 3, the second storage section 4, and the memory controller 5. An instruction 12a from the operation section 11 to the first storage section 3, an instruction 12b from the operation section 11 to the second storage section 4, and an instruction 12c from the operation section 11 to the memory controller 5 are illustrated conceptually using lines in the diagram.

Figure 2:
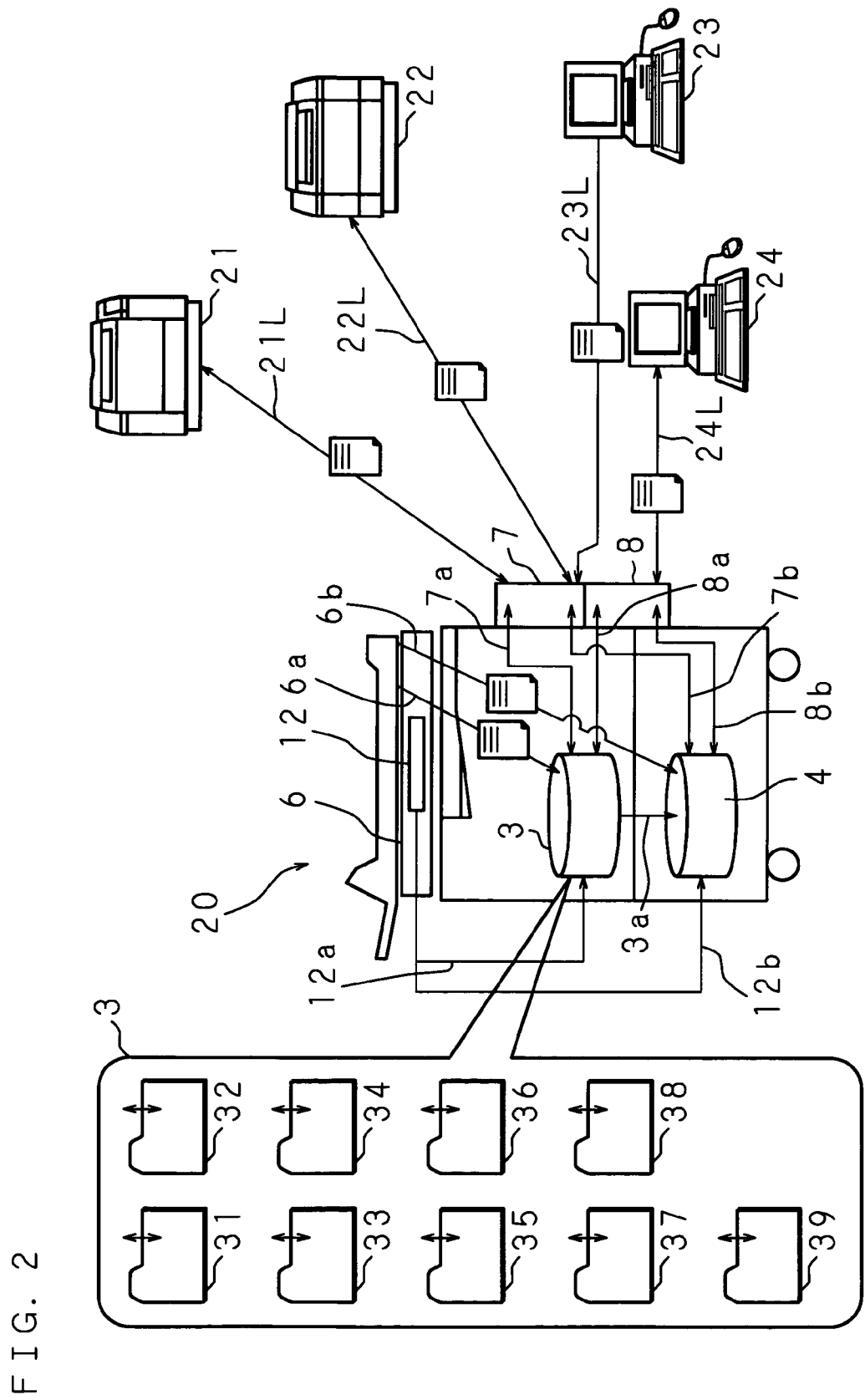
FIG. 2 is a diagram illustrating the outline of a composite apparatus comprising a data processing apparatus according to the invention and the outline of its first storage section.

FIG. 2 is a diagram illustrating the outline of the composite apparatus comprising the data processing apparatus according to the invention and the outline of its first storage section. In addition to serving as a copying machine, the composite apparatus 20 is connected, through an interface (the FAX section 7) serving as the communication means, to a destination FAX machine 21, a destination Internet FAX machine 22, and a PC 23 for PC-FAX transmission (along routes 21L, 22L, and 23L), so as to perform FAX transmission and FAX reception. Further, the composite apparatus 20 is connected through another interface (the network process section 8) to a PC 24 (along a route 24L), so as to print out transmitted data in response to an instruction from the PC 24. Data read out and inputted from the scanner section 6 undergoes appropriate processing depending on the necessity, and then outputted as data.

The data processing apparatus stores data having undergone output processing other than data having the specific data property into the first storage section 3 (6a, 7a, and 8a), while the data processing apparatus stores the data having the specific data property into the second storage section 4 (6b, 7b, and 8b). Further, in response to an instruction from the operation section, the data processing apparatus moves a part of the data stored in the first storage section 3 into the second storage section 4, and thereby performs the storage management. The first storage section 3 comprises storage folders corresponding to processing contents (jobs) or the like. These folders include a copy processing folder 31, a printer processing folder 32, a FAX transmission processing folder 33, a FAX reception processing folder 34, a scan-to-PC processing folder 35, a scan-to-email processing folder 36, an Internet FAX transmission processing folder 37, an Internet FAX reception processing folder 38, and a PC-FAX transmission processing folder 39. In some cases, in the first storage section 3, such classification depending on the processing contents is not carried out, and accordingly the data is accumulated in time series. Even in this case, classification may be carried out depending on the term of processing.

The data stored in the first storage section 3 can be ordered appropriately and then moved to the second storage section 4 (along a route 3a). This movement may be performed in response to an instruction (12a or 12b) from the operation panel 12, or alternatively in each predetermined period determined by an appropriate built-in program. In the second storage section 4, the storage region is partitioned in a stricter manner than in the first storage section 3. Accordingly, the second storage section 4 is suitable for the storage of data to be retained in a long term and the storage of data having a specific data property. The data stored in the first memory section 3 or the second memory section 4 can be read at any time. Thus, the data can be read out and outputted when the data becomes necessary again. Further, in the second storage section 4, the storage region is partitioned in a stricter manner (such as the folder form) based on the data property. This permits easy retrieval of desired data, and realizes rapid and efficient re-output of the data.

Figure 3:
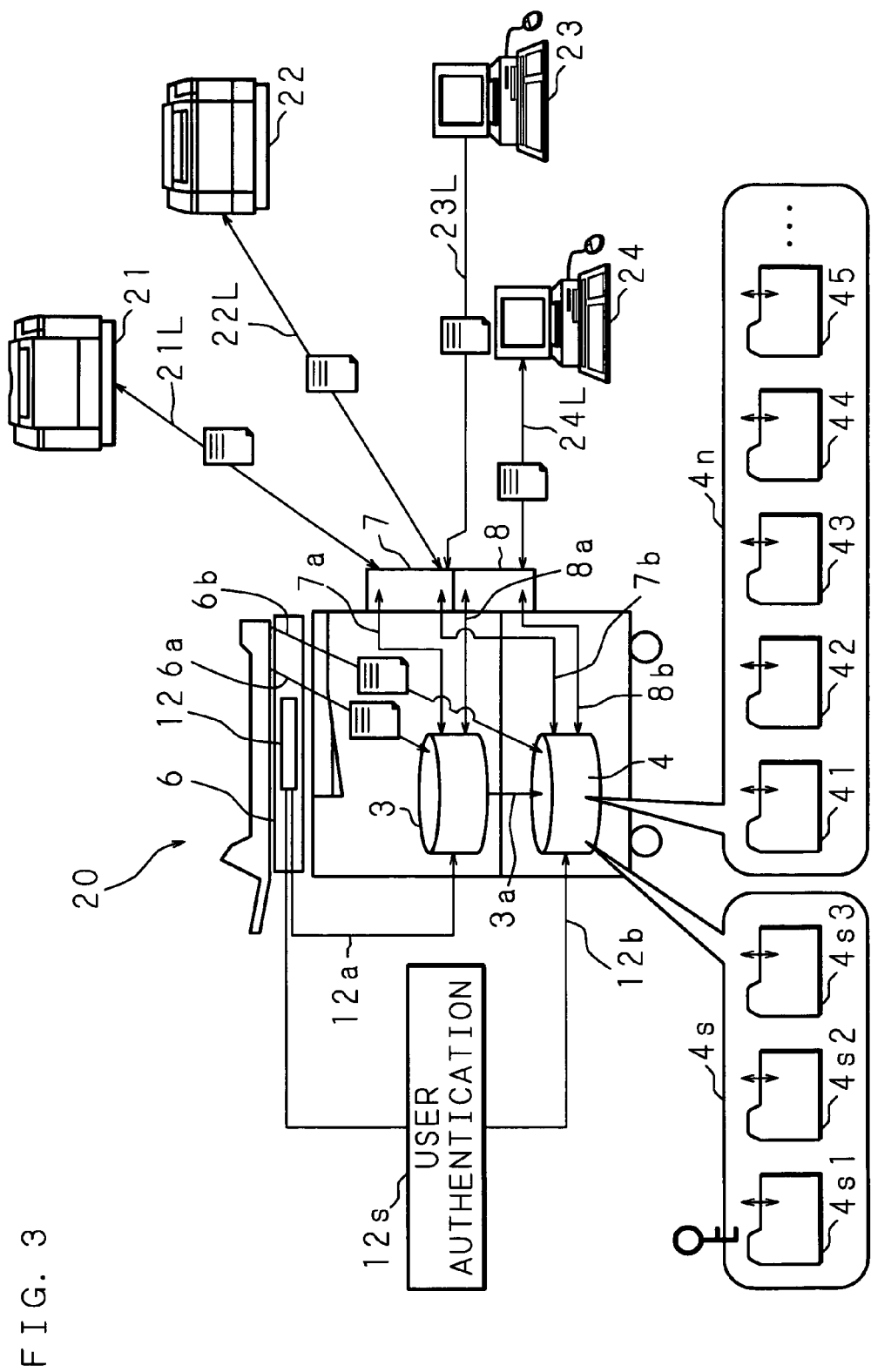
FIG. 3 is a diagram illustrating the outline of the function of a second storage section of the composite apparatus of FIG. 2.

FIG. 3 is a diagram illustrating the outline of the function of the second storage section of the composite apparatus of FIG. 2. Like parts to FIG. 2 are designated by like numerals, and hence detailed description is omitted. The second storage section 4 stores data in a state corresponded to storage regions partitioned in correspondence to the data properties. The storage regions may be, for example, in the form of folders. The storage regions are classified into a folder group 4n dedicated to various output processing types and a folder group 4s dedicated to specific data properties.

In general, the data stored in the folder group 4n can be moved from the first storage section 3 along the route 3a. Further, when necessary, a specific folder may be stored directly into the second storage section 4 in the initial stage. The folder group 4s is illustrated in an exemplary case that the data is set to be confidential (confidential data). The confidential data undergoes output/transmission processing in the data processing means 2, and then is transmitted to the memory controller 5 serving as the data distributing means. The data is stored directly into the second storage section 4, and not stored in the first storage section 3.

The folder group 4n dedicated to output processing types (job types) may include a copy processing folder 41, a printer processing folder 42, a FAX transmission processing folder 43, a FAX reception processing folder 44, and a scan-to-PC processing folder 45. For example, the copy processing folder 41 stores data having undergone copy and output processing. The printer processing folder 42 stores data having been printed out. The FAX transmission processing folder 43 stores data having been FAX-transmitted (21L). The FAX reception processing folder 44 stores data having been FAX-received (21L). The scan-to-PC processing folder 45 stores data having undergone scan-to-PC processing and is then transmitted to the PC 24.

The folder group 4s (a confidential folder 4s, in this case) dedicated to specific data properties may include personal confidential folders 4s1, 4s2, and 4s3 provided for respective persons. For example, the personal confidential folder 4s1 is a confidential folder for a user 1 (the user 1 confidential folder), while the personal confidential folder 4s2 is a user 2 confidential folder. Further, the personal confidential folder 4s3 is a user 3 confidential folder.

As described above, the confidential data is not stored into the first storage section 3 even after the output processing, and is directly transmitted to and stored into the second storage section 4 via the memory controller 5. The personal confidential folders 4s1, 4s2, and 4s3 for confidential data are provided in the second storage section 4. Thus, the data is stored into appropriate one among the personal confidential folders 4s1, 4s2, and 4s3 for storing solely the confidential data. The personal confidential folders 4s1, 4s2, and 4s3 can be set in advance in the composite apparatus by users. When a user uses a confidential folder 4s, the user needs to input a password through the operation panel 12 for user authentication 12s. When a predetermined password is inputted, appropriate one among the personal confidential folders 4s1, 4s2, and 4s3 in the confidential folder 4s becomes accessible.

FIGS. 4A and 4B are diagrams illustrating the situation of execution of a method for retaining confidential data in a composite apparatus operating as a scanner. FIG. 4A shows an example of input screen of the operation panel when user authentication is carried out for the confidentiality setting of data. FIG. 4B shows an example of input screen displayed when the user authentication of FIG. 4A has been successful and when a folder (retention destination) into which the data is to be stored, a file name, and the like have been inputted. The data treated in this example that the composite apparatus operates as a scanner is data read by the scanner section 6.

In FIG. 4A, a "confidential retention" button 12e is displayed on the operation panel 12. When the "confidential retention" button 12e is pressed, a "user name" setting button 12f and a "user ID" setting button 12g are displayed on a "user authentication" screen 12d. In this display status, when the "user name" setting button 12f is pressed, a software keyboard is displayed on the operation panel 12 so as to permit the inputting of a user name. When the "user ID" setting button 12g is pressed, an inputting section (not shown) is validated so as to permit the inputting of the user ID by means of a numeric keypad or the like. When the user name and the user ID are inputted, and then when an "OK" button 12h is pressed, confidential retention is permitted only when the inputted user name and user ID agree with those registered in advance. In this case, the display screen on the operation panel 12 becomes a "confidential retention setting" screen 15a shown in FIG. 4B.

On the "confidential retention setting" screen 15a, the "personal confidential folder" (user 1 confidential folder) of the authenticated user (for example, the user 1) is designated as the retention destination 15b. In general, at the time of authentication, the personal confidential folder of the user is automatically read and displayed as the retention destination 15b. When a "file name" setting button 15c is pressed, a software keyboard is displayed so as to permit the inputting of a file name. When a "secrecy" setting button 15d is pressed, a screen is displayed that permits the selection of a secrecy level depending on the desire of the user. The "secrecy" setting button 15d is described later in further detail.

When a "password" setting button 15e is pressed, the inputting section is validated so as to permit the inputting of numerals and the like by means of the numeric keypad or the like. On completion of the setting input of the password and the like, an "OK" button 15f is pressed. Then, the data (confidential data) is stored and retained in the confidential folder 4s of the second storage section 4 appropriately in synchronization with the output processing (such as output and transmission). At that time, the data is retained in the confidential folder 4s in the second storage section 4 and not in the first storage section 3. This permits the management of the confidential retention (confidential storage management) with protecting completely the confidential data stored in the confidential folder 4s from being viewed by many and unknown users.

The "user authentication" screen 12d, the "confidential retention setting" screen 15a, and the like serve as the confidentiality setting means. Further, the "confidential retention setting" screen 15a and the like serve as the condition setting means for setting a retention condition and a deletion condition for the data. These situations hold in the case that the composite apparatus serves as an apparatus other than the scanner.

Figure 5:
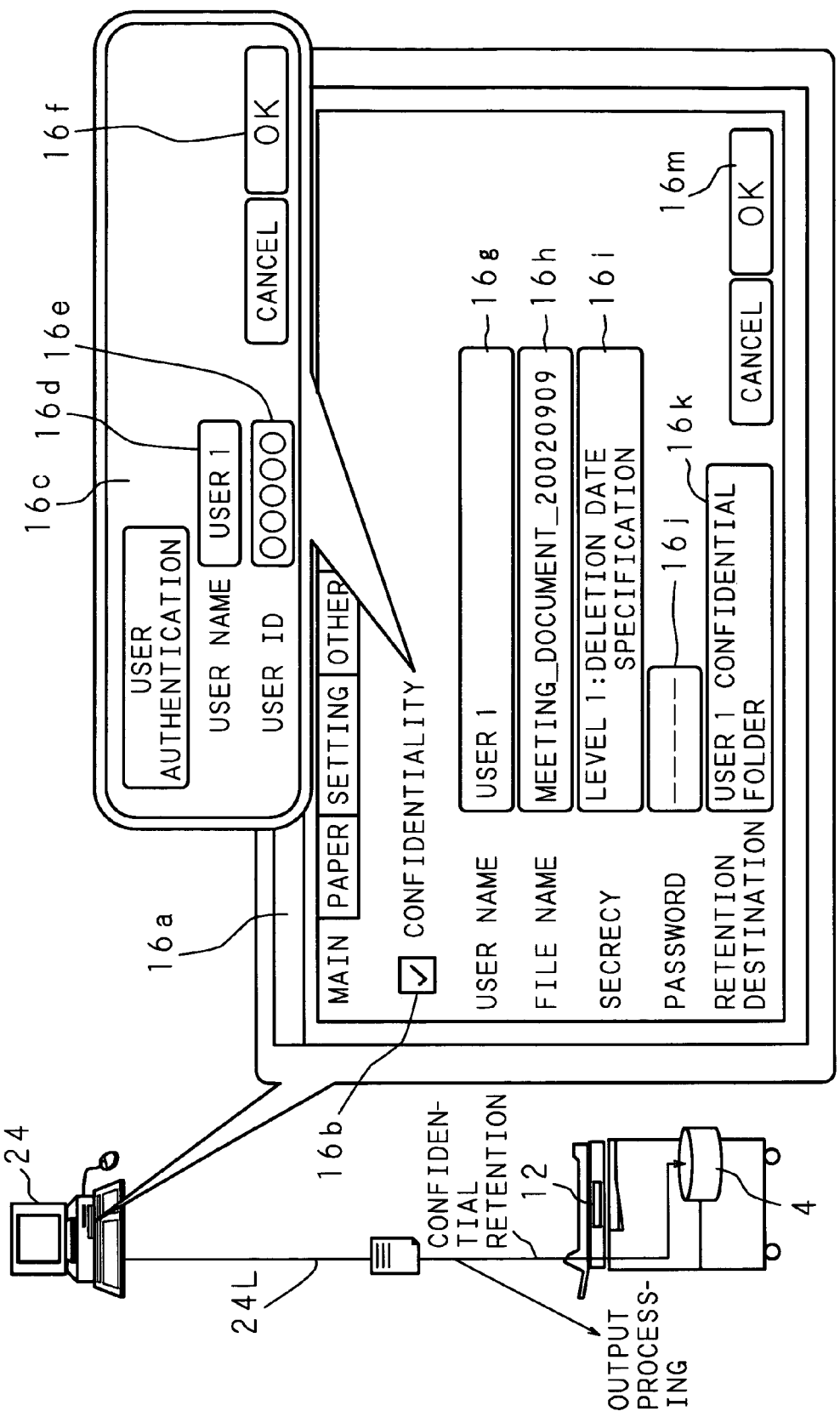
FIG. 5 is a diagram illustrating the situation of execution of a method for retaining confidential data in a composite apparatus having received a print instruction from a PC.

FIG. 5 is a diagram illustrating the situation of execution of a method for retaining confidential data in the composite apparatus having received a print instruction from a PC. That is, the figure illustrates the confidentiality setting carried out on a printer driver screen 16a of the PC 24, when the PC 24 issues a print instruction of certain data to the digital composite apparatus connected through the network such as along the route 24L. Similarly to the case that the data read by the scanner section 6 is set to be confidential (FIG. 4), when a check mark is inputted in a "confidentiality" check box 16b on the printer driver screen 16a, a user authentication screen 16c is displayed.

On the user authentication screen 16c, a "user name" setting button 16d and a "user ID" setting button 16e are displayed. In this display status, when the "user name" setting button 16d is pressed, the inputting of a user name through the PC 24 is permitted. The figure shows an example that the user 1 is inputted as the user name. When the "user ID" setting button 16e is pressed, the inputting of a user ID through the PC 24 is permitted. When the user name and the user ID are inputted, and then when an "OK" button 16f is pressed, confidential retention is permitted only when the inputted user name and user ID agree with those registered in advance. In this case, the confidential retention (confidential storage) is performed in the composite apparatus.

Similarly to the case of confidentiality setting in the scanner, on the printer driver screen 16a, the items of a "user name" setting button 16g, a "file name" setting button 16h, a "secrecy" setting button 16i, a "password" setting button 16j, a "retention destination" setting button 16k, and the like are set and inputted. Then, when an "OK" button 16m is pressed, the data (confidential data) is stored and retained in the confidential folder 4s of the second storage section 4 at the same time as the output processing. In this example, the printer driver screen 16a and the like serve as the confidentiality setting means and the condition setting means for setting a retention condition and a deletion condition for the data.

In order to improve the security, automatic deletion may be set at the same time as the confidentiality setting. For example, in case of a meeting document which becomes unnecessary after the meeting or a meeting document distributed under the condition of copy prohibition, a date is inputted into the file name in such a format "meeting_document_ 20020909" (see 15c in FIGS. 4B and 16h in FIG. 5, for example) at the time of confidentiality setting. That is, the "file name" setting button 16h serves also as the date inputting means. This date inputting means may be implemented in another appropriate manner. Further, calendar detecting means is provided for detecting a date corresponding to the date having been set by the date inputting means. The calendar detecting means is implemented appropriately, for example, by using an actual time clock built in the main body of the composite apparatus. Data deleting means is also provided for deleting the data when the calendar detecting means detects the corresponding date.

The execution of such processing can be implemented appropriately as a software process in the control section (not shown) provided in the main body of the composite apparatus. Thus, separate hardware is not necessary for such processing. Other (function implementing) means can be implemented similarly.

Figure 6A:
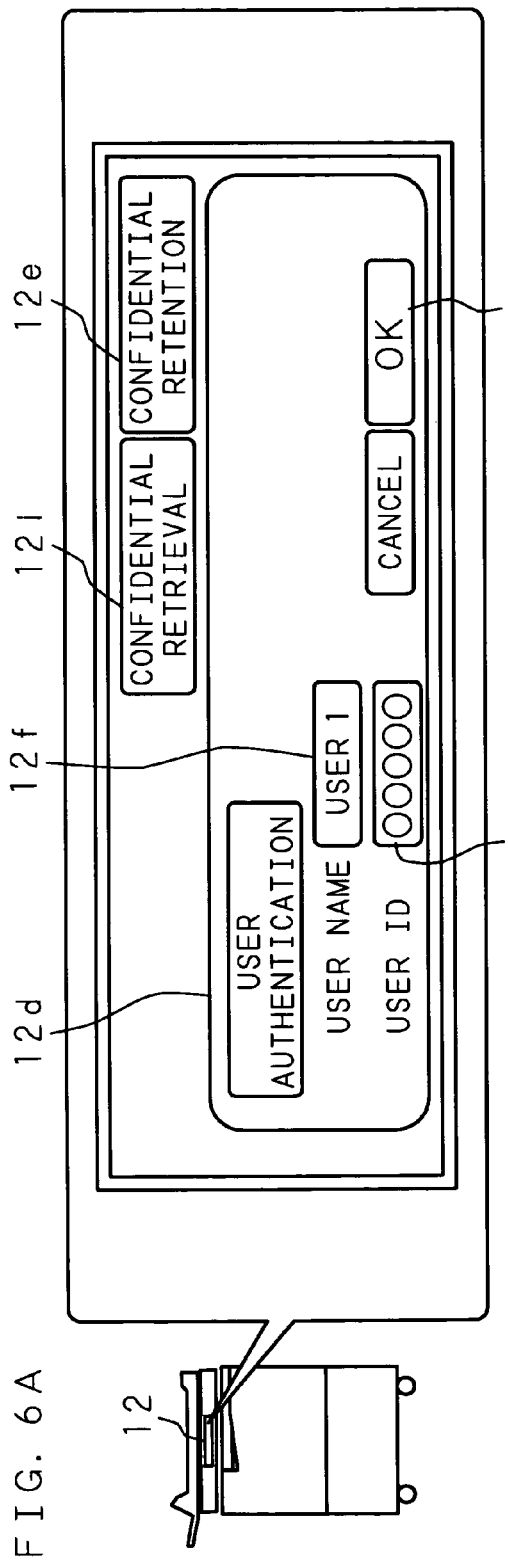
FIGS. 6A and 6B are diagrams illustrating the situation of execution of a method for accessing a confidential folder in a second storage section.
Figure 6B:
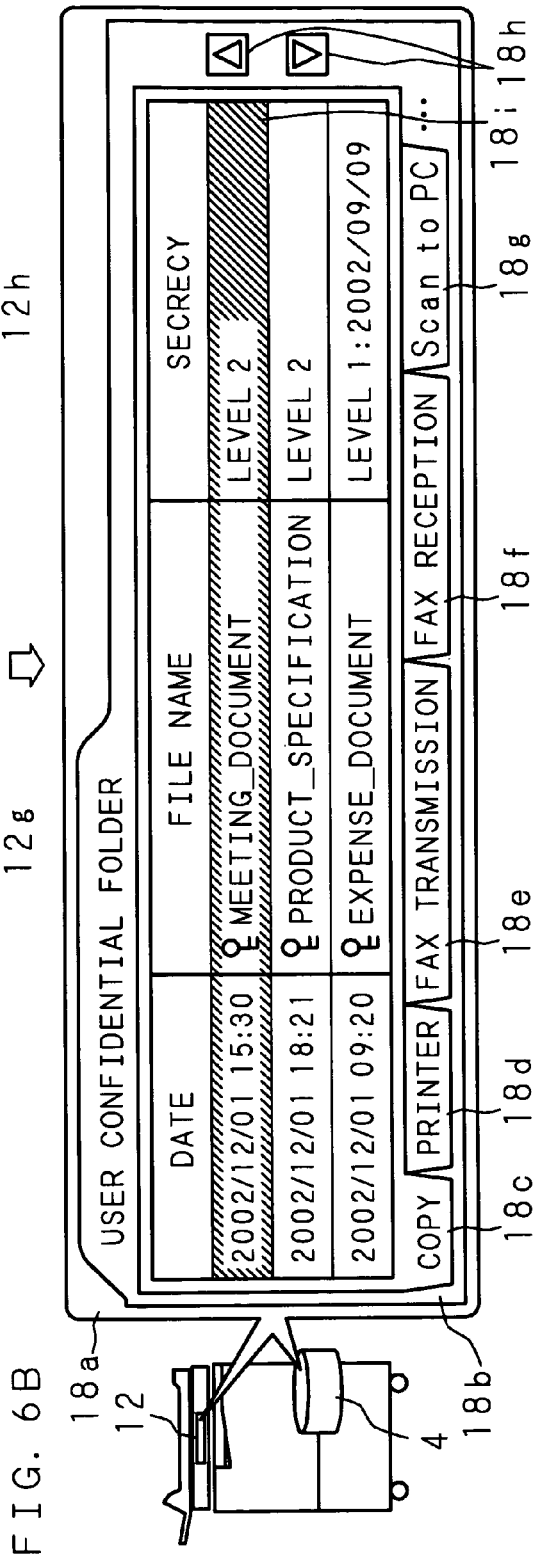

FIGS. 6A and 6B are diagrams illustrating the situation of execution of a method for accessing the confidential folder of the second storage section. FIG. 6A shows an example of input screen of the operation panel when user authentication is carried out in the mode of confidential folder access. FIG. 6B shows an example of confidential folder display screen displayed when the user authentication has been successfully carried out on the operation panel 12 of FIG. 6A.

In FIG. 6A, a "confidential retrieval" button 12i is displayed on the operation panel 12. When the "confidential retrieval" button 12i is pressed, a "user name" setting button 12f and a "user ID" setting button 12g are displayed on a "user authentication" screen 12d. In this display status, when the "user name" setting button 12f is pressed, a software keyboard is displayed on the operation panel 12 so as to permit the inputting of a user name. When the "user ID" setting button 12g is pressed, an inputting section (not shown) is validated so as to permit the inputting of the user ID by means of a numeric keypad or the like. When the user name and the user ID are inputted, and then when an "OK" button 12h is pressed, confidential retention is permitted only when the inputted user name and user ID agree with those registered in advance. In this case, the display screen on the operation panel 12 becomes a "confidential folder display" screen 18a shown in FIG. 6B.

On the "confidential folder display" screen 18a, the "confidential folder" (user 1 confidential folder 18b) of the authenticated user (for example, the user 1) is displayed. In this example, the user 1 confidential folder 18b lists the confidential data of each job. Examples of such jobs include a copy job, a printer job, a FAX transmission job, a FAX reception job, and a scan-to-PC job. Each job is provided with an index.

A copy index 18c, a printer index 18d, a FAX transmission index 18e, a FAX reception index 18f, and a scan-to-PC index 18g are shown as examples. Selected data is in an appropriately recognizable form such as reverse display (18i). Then, desired data is selected using an up-down button 18h. After the selection, a password inputting screen is displayed. When an appropriate password is inputted (for example, the password having been set in the confidential data retention is re-inputted), the operation of retrieving the data is permitted. This permits reliable retention and retrieval of the confidential data.

FIGS. 7A and 7B are diagrams illustrating the situation of execution of a method for setting a level of secrecy. The figure shows the situation that a determination level is provided depending on the level of the "secrecy" of the confidential data, so that a level of secrecy (the degree of secrecy) is specified at the time of confidentiality setting, and that automatic deletion is set for automatically deleting the data when the level is satisfied.

FIG. 7A shows a "confidential retention setting" screen 15a displayed on the operation panel 12 as the confidentiality setting means and the condition setting means for setting a retention condition or a deletion condition for the data. The configuration of the "confidential retention setting" screen 15a is similar to that of FIG. 4B, and hence detailed description is omitted. A level of secrecy having been set in advance is displayed on a "secrecy" setting button 15d. In this example, "level 1: deletion date specification" is set as the standard and displayed in reverse. In this situation of reverse display, when the "secrecy" setting button 15d is pressed, the display screen of the operation panel 12 becomes a "secrecy setting" screen 15g shown in FIG. 7B.

Examples of the determination levels depending on the level of secrecy include "level 0: no deletion date specification", "level 1: deletion date specification", "level 2: deletion after leaving the office", "level 3: deletion after leaving the room", and "level 4: deletion on completion of operation". At level 0, no specific deletion date is specified, and hence the data is to be deleted by an intentional operation of the user. At level 1, a deletion date is specified so that the date is deleted. When the setting button is pressed, a date inputting section becomes valid so as to permit the inputting of a date by means of a numeral keypad or the like.

At level 2, it is detected whether the user has left the office or not. Then, when it is determined that the user has left the office, the deletion is performed. Similarly, at level 3, it is detected whether the user has left the room or not. Then, when it is determined that the user has left the room, the deletion is performed. The methods of determination at levels 2 and 3 are described later. At level 4, when the user is -not present in the vicinity of the composite apparatus (data processing apparatus) or alternatively when no operation is performed for a predetermined time, it is determined that the user operation has been completed, so that the deletion is performed. The deletion condition for each level can be set (or selected) appropriately by means of inputting through the operation panel 12. This screen and the like used in the inputting and setting of the deletion condition corresponds to the deletion condition setting means.

On the "secrecy setting" screen 15g of FIG. 7B, a "level-0 selection" button 15h, a "level-1 selection" button 15i, a "level-2 selection" button 15k, a "level-3 selection" button 15m, and a "level-4 selection" button 15n are displayed. Further, a "specified date" setting button 15j is also displayed for inputting a specified date when "level 1" is selected. Levels 0-4 correspond to the determination levels classified into a plurality of classes depending on the level of the secrecy. The buttons (15h, 15i, 15k, 15m, and 15n) for selecting and inputting any one of the levels and the "secrecy setting" screen 15g serve as the determination level inputting means. On the "secrecy setting" screen 15g, the "level-1 selection" button 15i selected presently is clarified by means of reverse display or the like.

In this situation of reverse display, when the "specified date" setting button 15j is pressed, the inputting of a date is permitted. In this example, "2002/09/09 13:00" is inputted. The "specified date" setting button 15j is an example of the deletion condition setting means in the case that the deletion condition corresponding to the level of secrecy is a date for the deletion of the data. Further, the determination level inputting means serves also as the deletion condition setting means for setting a deletion condition for the deletion of the data. The deletion condition is not limited to those illustrated here, and can be set appropriately by an input operation through the operation panel 12. Further, automatic deleting means is separately provided for deleting the data automatically when the deletion condition is satisfied.

On the "secrecy setting" screen 15g, a deletion condition is set in correspondence to the classification of the determination level of secrecy. Alternatively, importance may be set in place of the secrecy or along with the secrecy. The determination level inputting means for inputting a determination level depending on the level of importance, the deletion condition setting means for setting a deletion condition for the deletion of the data the importance level of which is set, and the automatic deleting means for deleting the data automatically when the deletion condition is satisfied can be constructed similarly to those of the secrecy setting. Further, the deletion condition may be set to be the situation of the location of the person of the confidentiality setting.

When the expressions such as "level 1" displayed on the "secrecy" setting button 15d on the "confidential retention setting" screen 15a of FIG. 7A seems not very clear to understand, other expressions such as "for inter-company use only" and "for inter-division use only" indicating directly the level of importance may be used. Determination levels such as "for inter-company use only", "for inter-division use only", and "top secret" indicating the level of importance are provided, so that a retention term (a deletion term or deletion condition) is set separately depending on the level of importance. For example, a retention condition/deletion condition is set such that when "for inter-company use only" is selected, the data is deleted in one week after the operation. In this case, when the user selects "for inter-company use only", a warning message "the data is deleted in one week" may be displayed so as to inform the contents of the setting to the user.

Figure 8:
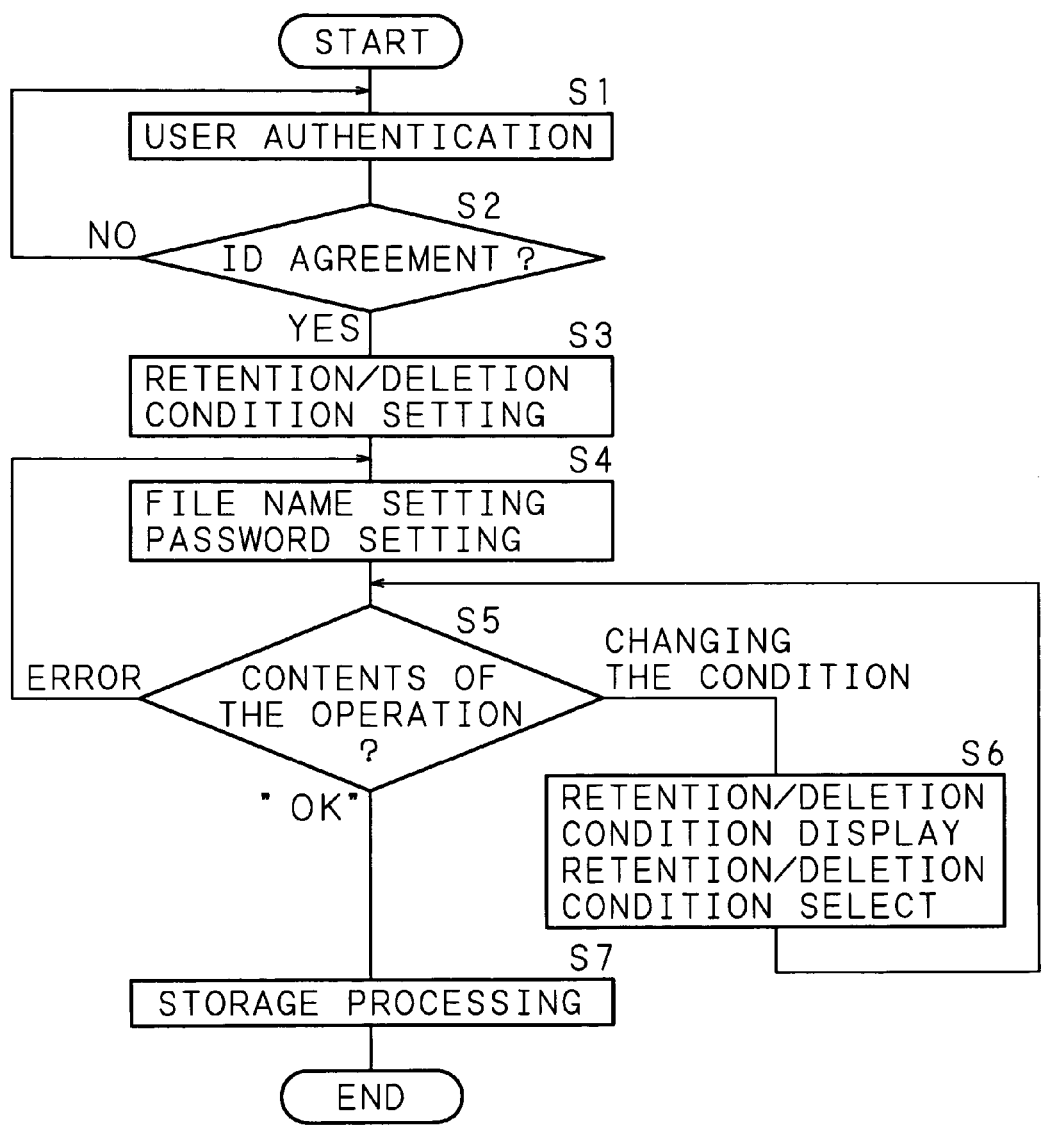
FIG. 8 is a flowchart illustrating an example of method for retaining confidential data.

FIG. 8 is a flowchart illustrating an example of method for retaining confidential data. First, user authentication is performed (step S1). The inputting of a user name and a user ID is requested here for user authentication. When a user name and a user ID are inputted, the user ID is compared with already-registered user IDs so that ID agreement is checked (step S2). In case of ID agreement (step S2: YES), the procedure goes to step S3. In case of ID disagreement (step S2: NO), the procedure is terminated (returns) and waits for the next user authentication. In step S3, a retention condition/deletion condition (such as a secrecy level) is set. In general, the retention condition/deletion condition here is set to be a predetermined standard value. Then, the procedure goes to step S4. In step S4, a file name and a password are set (inputted). When these two items are inputted, the procedure goes to step S5.

In step S5, (the type of) the contents of the operation is determined. When the contents is an operation of changing the retention condition/deletion condition, the procedure goes to step S6. In this changing operation, retention condition/deletion conditions are presented on the display screen according to an appropriately set program. When a desired retention condition/deletion condition is selected appropriately from those presented, the changing operation is completed, and hence the procedure returns to step S5. In case of an error in the input of a file name or a password (for example, disagreement to already-registered ones), the procedure concludes an error and returns to step S4. Then, the setting of a file name and a password is requested again. In step S5, when all the condition inputs are completed appropriately, and when the "OK" button described above (for example, the "OK" button 15f of FIG. 4B) is pressed, the procedure goes to step S7. Then, the retention processing (storage processing) is performed, and the confidential retention (confidential storage) is completed.

Figure 9:
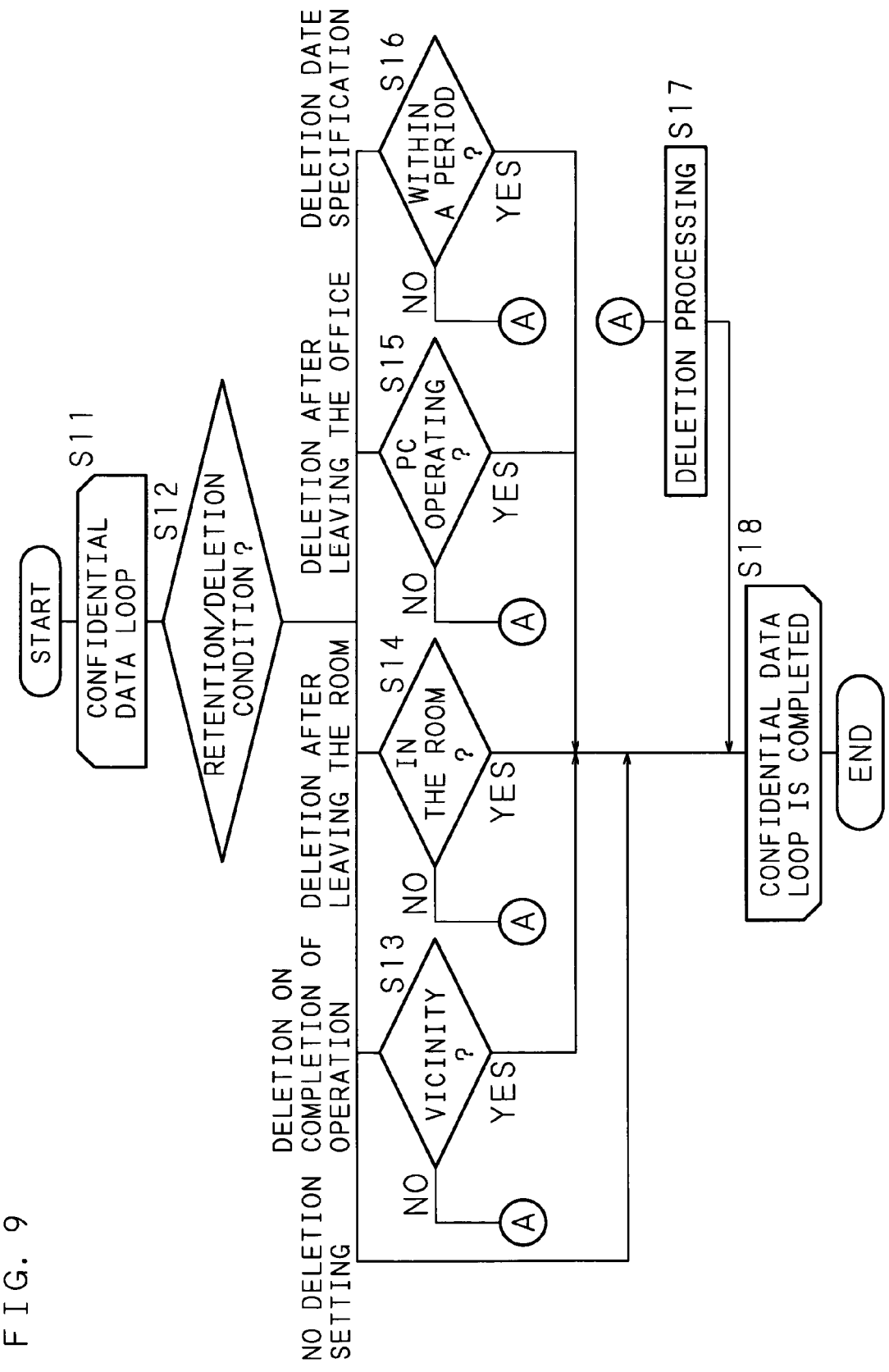
FIG. 9 is a flowchart illustrating an example of method for automatically deleting confidential data.

FIG. 9 is a flowchart illustrating an example of method for automatically deleting confidential data. In step S11, the processing (a confidential data loop) that the state of confidential data is searched in each time period is started. Then, the procedure goes to step S12. In step S12, the retention (condition)/deletion condition (secrecy level) of the confidential data is searched. When the retention/deletion condition is "no deletion setting", the procedure goes to step S18 so that the confidential data loop is completed.

When the retention/deletion condition is "deletion on completion of operation", the procedure goes to step S13, so that it is determined whether the user is present in the vicinity or not. When it is determined that the user is present in the vicinity (step S13: YES), the procedure goes to step S18, and the loop is completed. When it is determined that the user is not present in the vicinity (step S13: NO), the procedure goes to step S17. Then, the deletion processing for the confidential data is performed. On completion of the processing, the procedure goes to step S18, and the confidential data loop is completed.

The detection of whether the user is present in the vicinity or not can be implemented in various methods. For example, a wireless communication function is provided between the composite apparatus comprising the data processing apparatus according to the invention and a portable terminal, so that the data processing apparatus detects the identification information (user ID) of the portable terminal within a predetermined distance. This permits the detection of the presence or absence in the vicinity. Such a detecting function may be implemented by using appropriately the detecting function for identification information (the telephone number of a PHS phone terminal) used between a PHS phone terminal and a base station.

When the retention/deletion condition is "deletion after leaving the room", the procedure goes to step S14, so that it is determined whether the user is present in the room or not. When it is determined that the user is present in the room (step S14: YES), the procedure goes to step S18, and the loop is completed. When it is determined that the user is not present in the room (step S14: NO), the procedure goes to step S17. Then, the deletion processing for the confidential data is performed. On completion of the processing, the procedure goes to step S18, and the confidential data loop is completed. The method for detecting the presence of a user in a room is described below in the description of FIGS. 10 and 11.

When the retention/deletion condition is "deletion after leaving the office", the procedure goes to step S15, so that it is determined whether the user has left the office or not. In this example, whether the user has left the office or not is determined on the basis of whether the PC is operating or not. That is, when the PC owned (operated) by the user having set the data to be confidential is stopped, it is determined that the user has left the office. When it is determined that the PC is not operating (step S15: NO), the procedure goes to step S17. Then, the deletion processing for the confidential data is performed. On completion of the processing, the procedure goes to step S18, and the confidential data loop is completed.

When it is determined that the PC is operating (step S15: YES), the procedure goes to step S18, and the confidential data loop is completed. The determination of whether the devices connected to the network are operating or not can be implemented relatively simply by transmitting an operation status detection signal from a management PC on the network to each device in each time period and by detecting the presence or absence of a reply signal.

When the retention/deletion condition is "deletion date specification", the procedure goes to step S16, so that it is determined whether the date has expired or not. When it is determined that the date has expired (step S16: NO), the procedure goes to step S17. Then, the deletion processing for the confidential data is performed. On completion of the processing, the procedure goes to step S18, and the confidential data loop is completed. When it is determined that the date does not have expired (step S16: YES), the procedure goes to step S18, and the confidential data loop is completed. When the confidential data loop (the process of searching the status of the confidential data) is performed on all the confidential data, and when the searching and the processing on all the confidential data are completed, the processing of automatic deletion of confidential data is completed. The deletion processing in step S17 and the like correspond to the automatic deleting means for deleting automatically the data when the deletion condition having been set for each determination level is satisfied.

Figure 10:
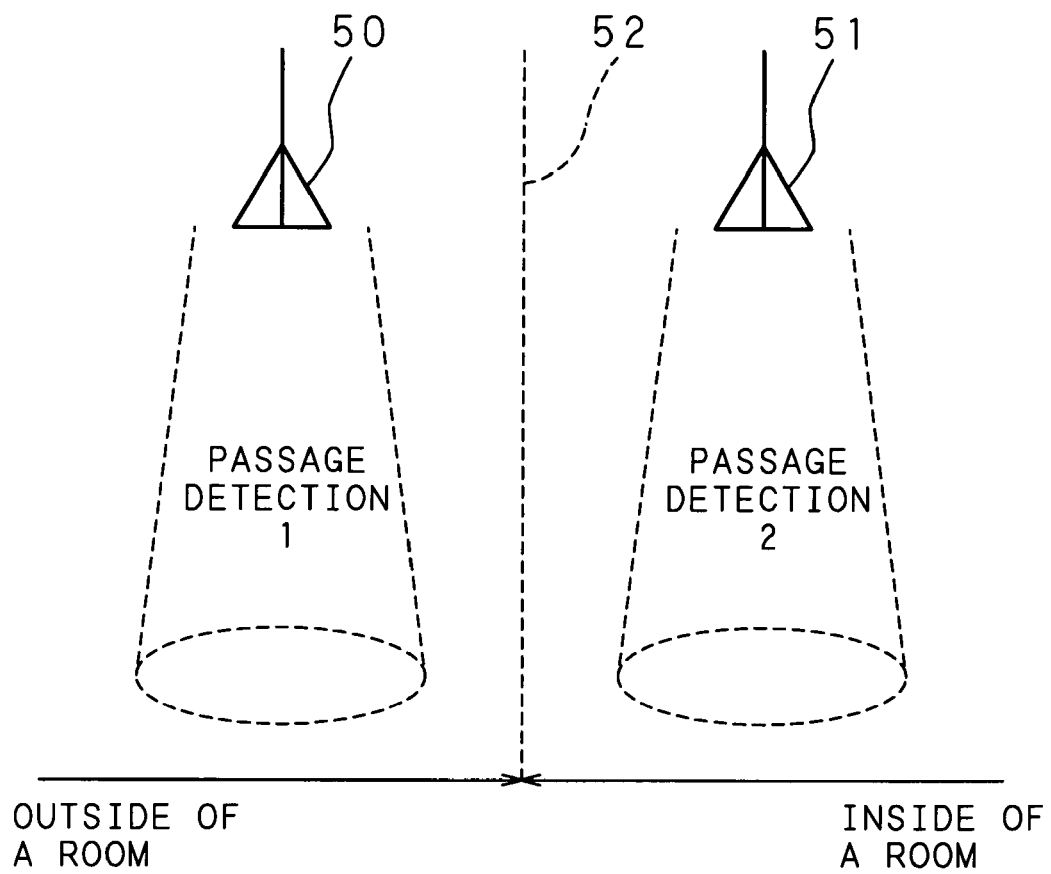
FIG. 10 is a digital illustrating a method for detecting the passage of a user in the inside and the outside of a room.

FIG. 10 is a digital illustrating a method for detecting the passage of a user in the inside and the outside of a room. At an entrance 52 of a room where the composite apparatus comprising the data processing apparatus according to the invention is installed, detecting means 50 and detecting means 51 are arranged inside and outside the room, respectively. By means of a wireless communication function, the detecting means 50 and 51 detect the identification information (user ID) of a portable terminal of a user approaching the room. Accordingly, the detecting means 50 and 51 can detect where the user carrying the portable terminal has passed through. The "passage detection 1" indicates the detection of passage in the outer vicinity of the entrance 52 of the room where the composite apparatus is installed, while "passage detection 2" indicates the detection of passage in the inner vicinity of the entrance 52 of the room. When any one of these is detected, the detection result is transmitted, for example, to the composite apparatus comprising a management function.

In the composite apparatus having been received "passage detection 1" or "passage detection 2", for example, when it is determined that a user ID having been detected in "passage detection 2" inside the room at 10:00:15 AM is detected in "passage detection 1" outside the room at 10:00:18 AM, it is determined that the user has exited. An example of the wireless communication function provided in the detecting means 50 and 51 is that of the PHS phone. A PHS phone terminal has the function of transmitting the telephone number (identification information) of the terminal itself and notifying its position to a base station. When such a function of the PHS phone is provided in the portable terminal carried by the user, the detecting means 50 and 51 serving as base stations receive the user ID from the portable terminal so as to detect accurately the approaching of the user (for example, an approach in a distance of 1 meter can be discriminated from that of 2 meters).

Figure 11:
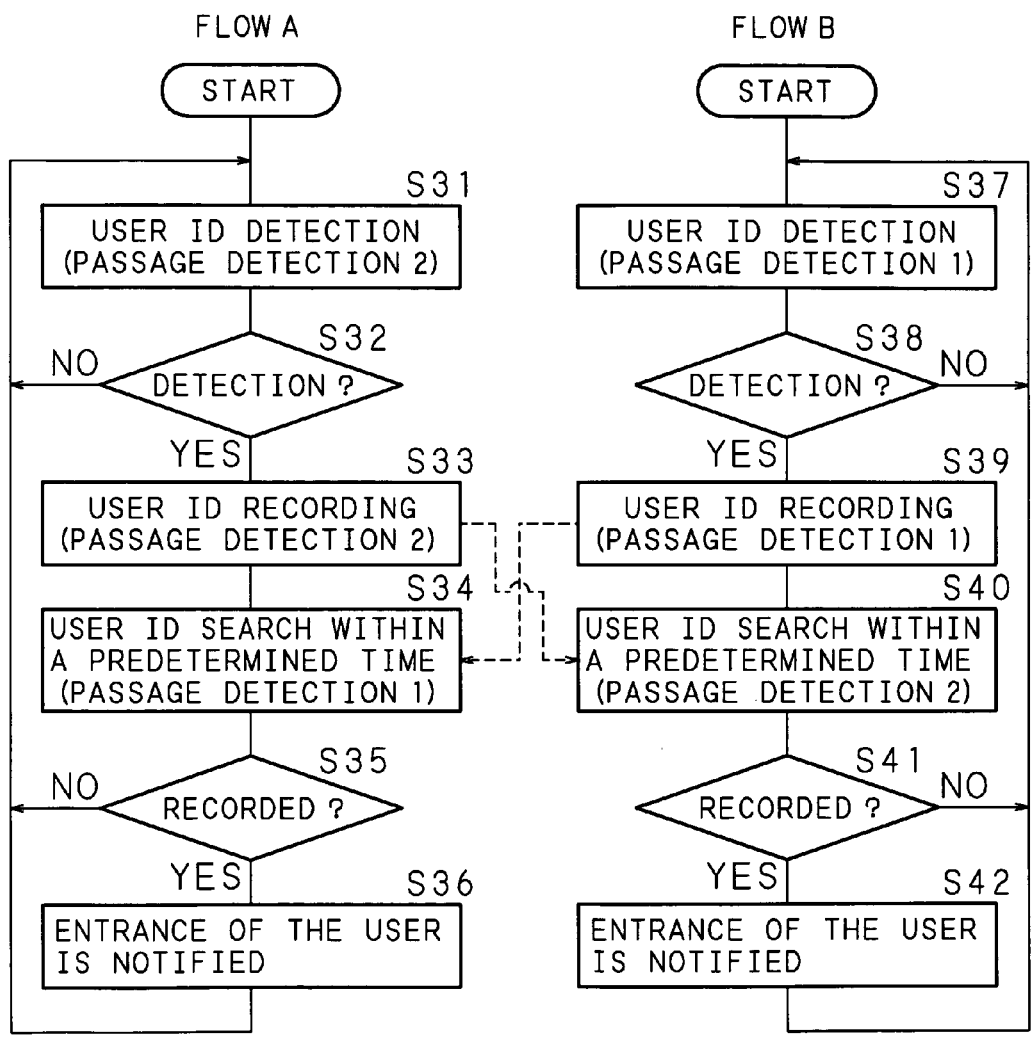
FIG. 11 is a flowchart illustrating an example of method for detecting the situation of presence of a user in a room according to the detection method of FIG. 10.

FIG. 11 is a flowchart illustrating an example of method for detecting the situation of presence of a user in the room according to the detection method of FIG. 10. The flow A of FIG. 11 shows a method for detecting the entrance of a user into the room, while the flow B of FIG. 11 shows a method for detecting the exit of a user from the room. In the flow A of FIG. 11, the detecting means 51 provided inside the room detects a user ID in "passage detection 2" (step S31). When a target user ID (for example, a user ID already registered as a management target in the composite apparatus) is detected (step S32: YES), the procedure goes to the next step. Then, it is recorded (user ID recording) that the user has passed through ("passage detection 2") (step S33). In this recording, for example, in the case that the detecting means 51 transmits the information to the composite apparatus so that the information is managed in the composite apparatus in a concentrated manner, the detecting means 51 does not need recording means. This permits a simple apparatus. When no target user ID is detected (step S32: NO), the procedure returns to the initial stage (step S31) of the flow, and waits for the next detection.

After the recording of the user ID (step S33), the procedure goes to the next step. Then, referring to "passage detection 1", the user ID is searched within a predetermined time (step S34). This search is achieved by referring to "passage detection 1" recorded in step S39 (see a dashed line). When the user ID is recorded in "passage detection 1" (step S35: YES), it is determined that the user has moved from the outside to the inside of the room. Then, the entrance of the user (user ID) is notified to the composite apparatus (stored in the composite apparatus) (step S36). Then, the procedure returns to the initial stage (step S31) of the flow, and waits for the next detection. When the user ID is not recorded in "passage detection 1" (step S35: NO), the procedure returns similarly to the initial stage of the flow, and waits for the next detection.

In the flow B of FIG. 11, "passage detection 1" and "passage detection 2" are interchanged in comparison with the flow A of FIG. 11. In the flow B of FIG. 11, the detecting means 50 provided outside the room detects a user ID in "passage detection 1" (step S37). When a target user ID is detected (step S38: YES), the procedure goes to the next step. Then, it is recorded (user ID recording) that the user has passed through ("passage detection 1") (step S39). When no target user ID is detected (step S38: NO), the procedure returns to the initial stage (step S37) of the flow, and waits for the next detection.

After the recording of the user ID (step S39), the procedure goes to the next step. Then, referring to "passage detection 2", the user ID is searched within a predetermined time (step S40). This search is achieved by referring to "passage detection 2" recorded in step S33 (see a dashed line). When the user ID is recorded in "passage detection 2" (step S41: YES), it is determined that the user has moved from the inside to the outside of the room. Then, the exit of the user (user ID) is notified to the composite apparatus (further notified to the automatic deleting means or the like) (step S42). Then, the procedure returns to the initial stage (step S37) of the flow, and waits for the next detection. When the user ID is not recorded in "passage detection 2" (step S41: NO), the procedure returns similarly to the initial stage of the flow, and waits for the next detection. As described above, the detection of entrance into the room performed in the flow A of FIG. 11 and the detection of exit from the room performed in the flow B of FIG. 11 permit the detection of the situation of the presence in the room and hence the detection of the exit from the room of the user of the confidential data.

As described above in detail, the invention provides a data processing apparatus not merely for outputting data such as image data, but also for storing the data in a state distributed to a storage destination depending on the data property of the data so as to permit easy reuse of the stored data and efficient storage management of the data based on the data property. Further, data having a specific data property is discriminated in the initial stage and stored directly into a desired storage region. This avoids the necessity of the movement of the data having a specific data property, and hence improves the efficiency in the storage management of the data.

The invention provides a data processing apparatus in which data having a data property of confidentiality is distributed to a second storage section, so that the convenience and the security of confidential data is improved.

The invention provides a data processing apparatus in which a retention condition or a deletion condition of data is set in each data job when the data is set to be confidential, so that the storage management of the data (storage management such as retention and deletion) can be performed with fine adjustment, and that the convenience is improved.

The invention provides a data processing apparatus in which a date is set as the deletion condition of data when the data is set to be confidential, so that the stored data is deleted when the set date arrives. This avoids the necessity of inputting a deletion date separately, and hence improves the convenience for the user.

The invention provides a data processing apparatus in which a determination level can be selected and set depending on the level of the secrecy or the importance of data, so that the convenience for the user is improved. This allows the user to input the determination level of the secrecy or the importance with confirming it directly. This avoids a mistake in the operation of confidentiality setting.

The invention provides a data processing apparatus in which the level of the secrecy or the importance is those classified into a plurality of classes so that the level of the secrecy or the importance is set with fine adjustment, and that the convenience in confidentiality setting is improved. Further, since a deletion condition is set for each of the classes depending on the determination level, the setting criteria for the setting of the level of the secrecy or the importance can be defined objectively. This avoids dispersion in the criteria of various users. Further, when the deletion condition is satisfied, the data is deleted automatically. This permits secure data retention management (data storage management) in the confidentiality setting.

The invention provides a data processing apparatus in which the deletion condition corresponding to the determination level is a date for the deletion of the data. This permits secure deletion of the data based on the date specified and inputted by the user.

The invention provides a data processing apparatus in which the deletion condition corresponding to the determination level is the situation of the location of the person of the confidentiality setting. This permits easy setting of the deletion condition in confidentiality setting, and avoids the opportunity of a mistake in the operation. Further, this avoids the necessity of the operation of deletion, and improves the security of secrecy and the convenience.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

The invention claimed is:

1. A data processing apparatus, comprising:
a data input unit for inputting data;
a data storage unit including a first storage section and a second storage section for storing the input data, wherein the first storage section is configured to store the input data temporarily and the second storage section is partitioned based on properties of the input data;
an outputting unit configured to perform output processing on the input data;
a data control unit configured to distribute the input data to either the first storage section or the second storage section depending on a property of the input data and transfer the stored input data from the first storage section to the partitioned region of the second storage section according to the properties of the input data, wherein the input data stored in the first storage section is deleted from the first storage section after being transferred to the partitioned region of the second storage section; and
a data delete control unit configured to delete the stored input data in the second storage section, set a deletion condition of the stored input data in the second storage section, and control deletion of the stored input data in the second storage section based on the deletion condition.

2. The data processing apparatus of claim 1, wherein the data control unit distributes the input data having the property of confidentiality to the second storage section.

3. The data processing apparatus of claim 2, further comprising:
a confidentiality setting section for setting the input data as confidential, wherein the deletion condition is set in each data job when the input data is set to be confidential.

4. The data processing apparatus of claim 3, further comprising:
a date inputting section for inputting a date as the deletion condition; and a calendar detecting section for detecting the date corresponding to the inputted date, wherein the stored input data in the second storage section is deleted when the date corresponding to the inputted date is detected.

5. The data processing apparatus of claim 2, further comprising:

a confidentiality setting section for setting the input data as confidential; and a determination level inputting section for inputting a determination level depending on a level of secrecy or importance of the input data when the input data is set as confidential.

6. The data processing apparatus of claim 5, further comprising:

an automatic deletion section for deleting the stored input data automatically when the deletion condition is satisfied, wherein the determination level is classified into a plurality of classes, and each of the classes is used as the deletion condition.

7. The data processing apparatus of claim 6, wherein the deletion condition is a date for deletion of the stored input data.

8. The data processing apparatus of claim 6, wherein the deletion condition is a situation of a location of a person of the confidentiality setting.

9. The data processing apparatus of claim 1, wherein the data control unit is a memory controller connected to the first storage section and the second storage section.

* * * * *